US006662892B2

(12) United States Patent
Falk et al.

(10) Patent No.: US 6,662,892 B2
(45) Date of Patent: Dec. 16, 2003

(54) AIR INTAKE FOR A MOTORIZED VEHICLE

(75) Inventors: Alfons Falk, Bonässund (SE); Tore Gustafsson, Bonässund (SE); Örjan Olsson, Örnsköldsvik (SE)

(73) Assignee: Alvis Hagglunds Aktiebolag, Ornskoldsvik (SE)

( * ) Notice: Subject to any disclaimer, the term of this patent is extended or adjusted under 35 U.S.C. 154(b) by 10 days.

(21) Appl. No.: 09/978,674

(22) Filed: Oct. 18, 2001

(65) Prior Publication Data
US 2002/0088655 A1 Jul. 11, 2002

(30) Foreign Application Priority Data
Oct. 18, 2000 (SE) .................................. 0003767

(51) Int. Cl.$^7$ .............................. B60K 11/00; F01N 5/02
(52) U.S. Cl. .................... 180/68.1; 180/68.2; 180/68.3; 60/320
(58) Field of Search ............... 180/68.1, 68.2, 180/68.3, 68.4, 68.6, 69.2, 69.21; 123/41.49, 41.58, 41.09; 296/192; 181/204, 259, 262; 60/320, 307, 317

(56) References Cited

U.S. PATENT DOCUMENTS

| 2,473,281 | A | * | 6/1949 | Findley | 180/68.1 |
| 3,358,787 | A | * | 12/1967 | Bangasser et al. | 180/69.2 |
| 3,923,114 | A | * | 12/1975 | Suzuki | 180/68.1 |
| 3,978,938 | A | * | 9/1976 | Joscher et al. | 180/68.4 |
| 3,982,600 | A | * | 9/1976 | Gerresheim et al. | 180/69.21 |
| 4,071,009 | A | * | 1/1978 | Kraina | 180/68.1 |
| 4,086,976 | A | * | 5/1978 | Holm et al. | 180/68.1 |
| 4,341,277 | A | * | 7/1982 | Adamson et al. | 180/68.1 |
| 4,385,678 | A | * | 5/1983 | Cederbaum | 181/204 |
| 4,492,282 | A | * | 1/1985 | Appelblatt et al. | 180/68.1 |
| 4,606,422 | A | * | 8/1986 | Jewett | 180/68.1 |
| 4,610,326 | A | * | 9/1986 | Kirchweger et al. | 180/68.1 |
| 4,689,060 | A | * | 8/1987 | Koske | 180/68.1 |
| 5,284,115 | A | * | 2/1994 | Imanishi et al. | 180/68.1 |
| 5,600,244 | A | * | 2/1997 | Jensen et al. | 324/309 |
| 5,660,244 | A | * | 8/1997 | Matsuda | 180/68.1 |
| 5,681,075 | A | * | 10/1997 | Komori et al. | 296/192 |
| 5,709,175 | A | * | 1/1998 | Carroll | 123/41.49 |
| 6,026,768 | A | * | 2/2000 | Spitler et al. | 123/41.58 |
| 6,167,976 | B1 | * | 1/2001 | O'Neill et al. | 180/69.2 |
| 6,302,228 | B1 | * | 10/2001 | Cottereau et al. | 180/68.1 |

* cited by examiner

Primary Examiner—Brian L. Johnson
Assistant Examiner—Hau Phan
(74) Attorney, Agent, or Firm—Young & Thompson

(57) ABSTRACT

An air intake for a motorized vehicle, for obtaining a low radar and IR signature of a ballistically protected air intake (10) of the vehicle. The air intake (10) has a perforated armour plate (12) lying level with an outer bodywork plate (14) of the vehicle, and a fresh-air duct (18) which adjoins the inside of the perforated armour plate (12) and which has a fan (20) for sucking the fresh air necessary for running the vehicle into the duct via air intake openings (16) in the armour plate. A wall section (22) of the fresh-air duct (18) situated between the air intake openings (16) and a heat-generating source (24) in the vehicle is air-cooled.

20 Claims, 2 Drawing Sheets

AIR INTAKE FOR A MOTORIZED VEHICLE

TECHNICAL FIELD

The present invention relates to an air intake for a motorized vehicle, in particular for obtaining a low radar and infrared ("IR") signature of a ballistically protected air intake of the vehicle, where a heat-emitting source in the vehicle is placed in immediate proximity to the air intake, comprising a perforated armour plate lying level with an outer bodywork plate of the vehicle, and a fresh-air duct which adjoins the inside of the perforated armour plate and which has a fan for sucking the fresh air necessary for running the vehicle into the duct via air intake openings in the armour plate.

PRIOR ART

In a combat vehicle driven by a combustion engine, in order to protect an air intake ballistically and at the same time to obtain a signature adjustment of same with respect to infrared, i.e. to give the air intake a low infrared signature, the air intake has previously been designed as an approximately 7-cm thick screen consisting of labyrinthine profiles which form air intake openings, so-called ballistic screens, which prevent direct viewing into the fresh-air duct and thus make it difficult to detect by infrared a heat-generating engine situated near the air intake. Such ballistic screens are very heavy and complicated to produce.

OBJECT OF THE INVENTION AND ITS SOLUTION

An object of the present invention is to make available a ballistically protected and signature-secured air intake for a motorized vehicle, where the perforated armour plate has a low height and weight and also a low signature with respect to both RR and infrared. For this purpose, said air intake according to the invention is characterized in that the fresh-air duct has an airflow-deflecting wall section situated between the air intake openings in the armour plate and the heat-emitting source, which wall section is provided with at least one air bypass duct for cooling the wall section. Since the design of said wall section means that it can be kept cooled during vehicle operation, this makes it difficult to detect by infrared cameras, and at the same time the perforation openings in the plate can be punched out easily as straight small holes in a relatively thin-walled armour plate with a thickness of only about 5 to 10 mm.

Said airflow-deflecting wall section can here be designed as a double wall with an air bypass duct in between, where one wall part of the double wall can be of anti-splinter design, preferably made of armour plate.

The air bypass duct is preferably connected upstream to a fresh-air intake and connected downstream to the fresh-air duct upstream of the fan.

To obtain a good RR signature on the outside of the perforated armour plate, a fine-mesh net with a mesh width of about 2 to 5 mm is preferably placed over the air intake openings in the armour plate.

The invention will be described in more detail below with reference to the attached drawing.

DETAILED DESCRIPTION OF PREFERRED EMBODIMENT

Figure 1:
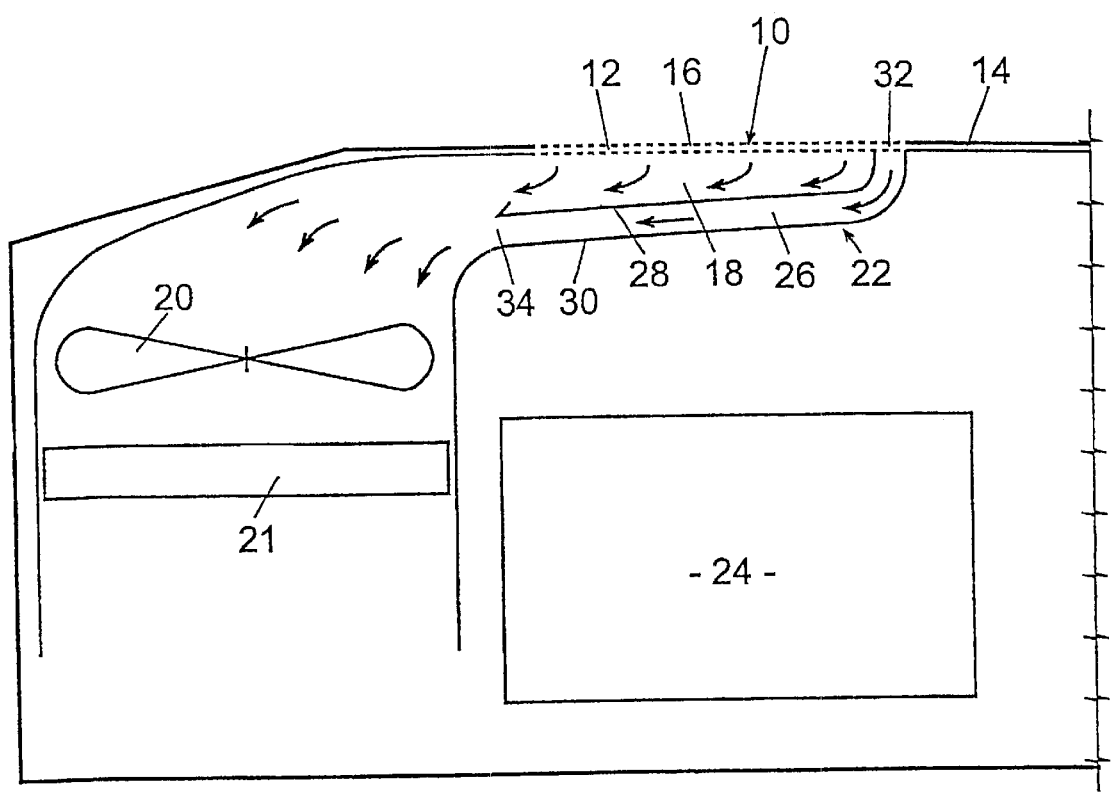
FIG. 1 is a diagrammatic side view of a ballistically protected and signature-adapted air intake according to the invention for a motorized combat vehicle.

In FIG. 1, a ballistically protected fresh-air intake according to the invention for a motorized combat vehicle is designated in general by reference number 10. The air intake comprises a plane perforated armour plate 12 lying level with an outer, preferably upper bodywork plate 14 of the vehicle. The armour plate 12 has a thickness of about 5 to 10 mm, which permits simple punching out of air intake openings 16 with a diameter of the same order of size as the thickness of the plate 12.

Adjoining the inside of the perforated plate 12 is a fresh-air duct 18 in which a fan 20 (shown diagrammatically) can draw fresh air into the vehicle in order to provide the vehicle with air for the combustion of the fuel and for cooling of the engine (cooler 21) and possibly supply air to the crew areas. The duct 18 is angled immediately inside the perforated armour plate 12 by means of a wall section 22 which is situated between the plate 12 and a heat-emitting source, in this case a combustion engine 24. In order to reduce the infrared signature from the air intake, i.e. to make it difficult to detect with the aid of thermal imaging cameras directed towards the wall section 22 exposed via the air intake openings 16, it is later provided with at least one air bypass duct 26 which is designed to cool the wall section 22 to a temperature which gives a low infrared signature. The bypass duct 26 can be formed by a double wall consisting of an inner wall element 28 and an outer wall element 30, the latter preferably being made of armour plate or other suitable anti-splinter material so that in the event of damage to the air intake 10 it will strengthen the fresh-air duct 18 and intercept splinters.

The upstream end of the bypass duct 26 can open into one or more intake openings 32 in the perforated armour plate 12 or into a separate intake at a distance from the plate 12, while the downstream end 34 of the duct 26 opens into the fresh-air duct 18 upstream of the fan 20, so that the latter can also suck cooling air into the bypass duct 26 in order to keep the wall section 22, and in particular the wall element 28 facing towards the perforated armour plate 12, cool and thus minimize the IR signature of the air intake which will otherwise be created by the adjacent heat-emitting engine 24.

Figure 2:
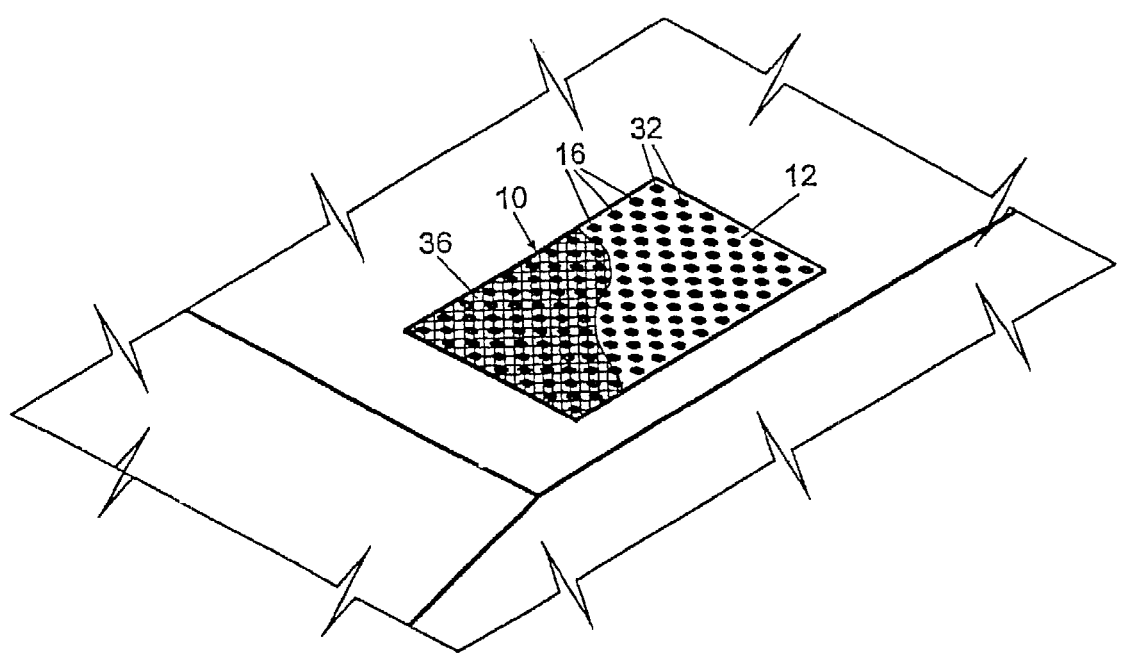
FIG. 2 is a cutaway perspective plan view of the air intake in FIG. 1, with a fine-mesh net placed over the air intake openings in the armour plate.

In order also to minimize the RR signature of the air intake 10 and reduce the risk of detection by radar, a fine-mesh net 36 (mesh width about 2 to 5 mm) is placed on the outside of and over the air intake openings 16, 32, as is shown in FIG. 2.

What is claimed is:

1. Air intake for a motorized vehicle, for obtaining a low radar and infrared signature of a ballistically protected air intake (10) of the vehicle, in which a heat-emitting source (24) in the vehicle is placed in immediate proximity to the air intake (10), comprising:

a perforated armour plate (12) lying level with an outer bodywork plate (14) of the vehicle, and a fresh-air duct (18) which adjoins the inside of the perforated armour plate (12) and which has a fan (20) for drawing the fresh air for running the vehicle into the duct (18) via air intake openings (16) in the armour plate (12), wherein the fresh-air duct (18) has an airflow-deflecting wall section (22) situated between the air intake openings (16) in the armour plate (12) and the heat-emitting source (24), which wall section (22) is provided with at least one air bypass duct (26) for cooling the wall section (22).

2. Air intake according to any of claim 1, characterized in that the air bypass duct (26) is connected upstream to a fresh-air intake (32) and downstream (34) to the fresh-air duct (18) upstream of the fan (20).

3. Air intake according to any of claim 1, characterized in that the perforated armour plate (12) has a thickness of about 5 to 10 mm and air intake openings (16) with a diameter substantially identical in size to the thickness.

4. Air intake according to claim 1, characterized in that a fine-mesh net (36) is placed over the air intake openings (16) in the armour plate (12).

5. Air intake according to claim 4, characterized in that the net (36) has a mesh width of about 2 to 5 mm.

6. Air intake for a motorized vehicle for obtaining a low radar and infrared signature of a ballistically protected air intake (10) of the vehicle, in which a heat-emitting source (24) in the vehicle is placed in immediate proximity to the air intake (10), comprising:

a perforated armour plate (12) lying level with an outer bodywork plate (14) of the vehicle, and a fresh-air duct (18) which adjoins the inside of the perforated armour plate (12) and which has a fan (20) for drawing the fresh air for running the vehicle into the duct (18) via air intake openings (16) in the armour plate (12), wherein the fresh-air duct (18) has an airflow-deflecting wall section (22) situated between the air intake openings (16) in the armour plate (12) and the heat-emitting source (24), which wall section (22) is provided with at least one air bypass duct (26) for cooling the wall section (22), and the airflow-deflecting wall section (22) is configured as a double wall (28, 30) with an air bypass duct (26) lying in between.

7. Air intake according to claim 6, characterized in that one wall part (30) of the double wall is of anti-splinter design.

8. Air intake according to claim 7, characterized in that the wall part (30) of the double wall facing away from the fresh-air duct (18) is of anti-splinter design, preferably made of armour plate.

9. Air intake of claim 6, wherein the one wall part is made of armor plate.

10. An air intake for a motorized vehicle for obtaining a low infrared signature, comprising:

a perforated plate with air intakes on an exterior surface of the vehicle;

a fresh-air duct adjoining an inside of the perforated plate;

a fan in communication with the fresh-air duct for drawing fresh air, for running the vehicle, through the fresh-air duct via the air intakes; and an airflow-deflecting wall section running parallel to the fresh-air duct and located intermediate the fresh-air duct and a heat-emitting source of the vehicle.

11. The intake of claim 10, wherein the airflow-deflecting wall section is comprised of a double wall with an air bypass duct lying in between the double wall.

12. The intake of claim 10, wherein the fresh-air duct and the airflow-deflecting section comprise two parallel, non-mixing air paths.

13. The intake of claim 10, wherein the fresh-air duct and the airflow-deflecting section provide two parallel, non-mixing air paths that exit to a common space.

14. The intake of claim 10, wherein the fresh-air duct draws the fresh air from a first portion of the perforated plate and the airflow-deflecting section draws the fresh air from a second portion of the perforated plate so as to provide two parallel, non-mixing air paths from the perforated plate and along an entire length of the perforated plate.

15. The intake of claim 10, wherein the airflow-deflecting wall section runs parallel to the fresh-air duct along an entire length of the perforated plate.

16. The intake of claim 10, wherein the airflow-deflecting wall section runs parallel to the fresh-air duct along an entire length of the heat emitting source of the vehicle.

17. The intake of claim 10, wherein the airflow-deflecting wall section and the fresh-air duct provide two isolated air pathways running along an entire length of the heat emitting source of the vehicle.

18. The intake of claim 10, wherein the airflow-deflecting wall section and the fresh-air duct provide two isolated air pathways isolating the heat emitting source of the vehicle from the perforated plate.

19. The intake of claim 10, wherein the airflow-deflecting wall section and the fresh-air duct extend in parallel beyond an entire area located below the perforated plate.

20. The intake of claim 10, wherein, the airflow-deflecting wall section is connected to the perforated plate at a first location and the fresh-air duct is connected to the perforated plate at a second location, the first location being upstream of the second location, and the perforated plate is level with an outer bodywork plate of the vehicle.

\* \* \* \* \*